United States Patent [19]

Jones

[11] 4,164,360
[45] Aug. 14, 1979

[54] CONTROL CIRCUIT HAVING ADAPTIVE TURN-OFF FEATURE FOR A VEHICLE SKID CONTROL SYSTEM

[75] Inventor: James J. Jones, Plano, Tex.

[73] Assignee: Texas Instruments Incorporated, Dallas, Tex.

[21] Appl. No.: 853,365

[22] Filed: Nov. 21, 1977

[51] Int. Cl.$^2$ ............................................. B60T 8/08
[52] U.S. Cl. ..................................... 303/110; 303/20
[58] Field of Search .................... 188/181; 303/20, 96, 303/103, 106, 110, 111

[56] References Cited

U.S. PATENT DOCUMENTS

| | | | |
|---|---|---|---|
| 3,578,819 | 5/1971 | Atkins | 303/106 |
| 3,825,305 | 7/1974 | Kasselmann et al. | 303/110 |
| 3,833,270 | 9/1974 | Gotz et al. | 303/106 |
| 3,861,756 | 1/1975 | Arikawa | 303/106 |
| 3,863,993 | 2/1975 | Fleischer et al. | 303/106 |
| 3,980,349 | 9/1976 | Cook | 303/110 |
| 3,982,793 | 9/1976 | Jones | 303/106 |
| 3,993,363 | 11/1976 | Skoyles et al. | 303/110 |

Primary Examiner—Stephen G. Kunin
Attorney, Agent, or Firm—Melvin Sharp; Richard L. Donaldson; William E. Hiller

[57] ABSTRACT

A control circuit having an adaptive turn-off feature for a vehicle skid control braking system, wherein the control circuit is responsible for producing a brake control signal which is effective to disengage the brakes of the vehicle by actuating a brake control valve to a fluid pressure-relieving position. The control circuit features an adaptive turn-off circuit which terminates the brake control signal, thereby enabling re-engagement of the vehicle brakes depending on the coefficient of friction of the road surface being travelled by the vehicle and the degree to which the wheel speed departs from the vehicle speed during the brake disengage cycle of the control circuit. The adaptive turn-off circuit of the control circuit utilizes a wheel departure amplifier which provides an inverted wheel departure signal as determined during a brake disengage cycle of the control circuit, the inverted wheel departure signal being referenced to a zero voltage. The adaptive turn-off circuit also includes a lead resistor which effectively shifts the inverted wheel departure signal by an amount proportional to the coefficient of friction of the road surface. The adaptive turn-off circuit further includes a turn-off threshold circuit, the output of the wheel departure amplifier being received as an input by the turn-off threshold circuit so as to produce an output signal from the adaptive turn-off circuit terminating the brake control signal from the control circuit whenever the output of the wheel departure amplifier falls below the threshold value of the turn-off threshold circuit.

7 Claims, 15 Drawing Figures

CONTROL CIRCUIT HAVING ADAPTIVE TURN-OFF FEATURE FOR A VEHICLE SKID CONTROL SYSTEM

BACKGROUND OF THE INVENTION

This invention relates to a control circuit for a vehicle skid control system, and more particularly to a control circuit having an adaptive turn-off feature which terminates a brake-releasing brake control signal produced as an output from the control circuit and indicative of an imminent skid condition, thereby re-engaging the vehicle brakes so as to more effectively stop the vehicle, wherein the adaptive turn-off feature depends upon the coefficient of friction of the road surface being travelled by the vehicle and the degree to which the wheel speed decelerates in departing from the vehicle speed during the brake release cycle of the control circuit.

When the operator of a wheeled land vehicle desires to stop the vehicle under emergency braking conditions or under adverse road conditions, a realistic probability exists that the wheels of the vehicle may tend to lock up, thereby causing the vehicle to undergo an uncontrolled skid or a controlled skid, which could prevent the operator from stopping the vehicle within a safe distance. Under these circumstances, one factor indicative of an imminent skid condition is the relative relationship between vehicle wheel speed and vehicle speed. It is generally accepted by safety experts and professional land vehicle drivers that vehicle stability during an imminent skid condition can best be achieved by "pumping" of the brakes associated with the wheels of the vehicle in a manner providing for alternating braking and non-braking cycles. Vehicle skid control systems have been developed that operate on this principle of brake-pumping, wherein normal braking action as initiated by the operator of a wheeled land vehicle is selectively inhibited during operating conditions indicative of an imminent skid condition. Typically, such a vehicle skid control system utilizes wheel speed sensors to generate AC voltage signals that are proportional to vehicle wheel speed. The vehicle wheel speed signals are then processed through a frequency converter which generates a DC voltage proportional to vehicle wheel speed. Application of the vehicle brakes by the operator in a normal manner causes the wheels to decelerate. Should the deceleration rate of wheel speed as sensed by a deceleration rate detector equal or exceed a threshold level indicative of an impending wheel lock-up or skid condition, a brake control signal is produced from the control circuit of the skid control system to the vehicle brake actuator solenoid valve. Upon actuation of the brake actuator solenoid valve by the brake control signal, the fluid braking pressure to the vehicle wheels is relieved, thereby inhibiting the vehicle wheel braking action. The vehicle wheels then begin to spin-up or accelerate in speed. When the vehicle wheels spin-up to a speed approaching or approximating vehicle speed, the brake-inhibiting control signal is terminated, thereby de-energizing the brake actuator solenoid valve. This in turn restores line pressure in the vehicle braking system and re-engages the vehicle brakes. In effect, what is achieved by such a skid control system is an automatic "pumping" or "pulsing" of the vehicle brakes in a manner often recommended for controlled braking under adverse driving conditions. Vehicle skid control systems utilizing this automatic brake "pumping" principle are described in detail in my pending application Ser. No. 25,131, filed Apr. 2, 1970, and in U.S. Pat. Nos. 3,944,289 and 3,982,793, respectively, issued to me on Mar. 16, 1976 and Sept. 28, 1976.

A major problem encountered with vehicle skid control systems of the automatic brake pumping type heretofore developed is to determine the precise point during the brake inhibit cycle at which the wheel speed approximates the vehicle speed, i.e. the point at which the brake-inhibiting control signal produced by the control circuit should be terminated to enable the vehicle brakes to be reapplied. Although it is comparatively simple to determine that the vehicle wheels are decelerating at a rate indicative of an imminent skid condition, it is difficult, once the brakes have been disengaged by operation of the skid control system to determine the precise time at which the brakes should be re-applied because the vehicle speed, and therefore the degree to which the wheel speed is below the vehicle speed at a given instant are unknown. Typically, skid control systems attempt to approximate the vehicle speed and are designed to reapply the brakes when the wheel speed approaches the estimated vehicle speed. Under varying driving conditions, these types of skid control systems may not reapply the brakes soon enough because they fail to give proper consideration to either the coefficient of friction $\mu$ of the road surface on which the vehicle is travelling or the degree to which the wheel speed has departed from the vehicle speed during a wheel deceleration cycle producing a brake control signal relieving the brake pressure.

On high $\mu$ surfaces, such as dry concrete, a more rapid pulsing of the vehicle brakes is desirable, since the wheels tend to adhere to the braking surface because of the better traction and to spin-up at a faster rate once the brake inhibiting control signal is produced as an output from the control circuit of the skid control system. Similarly, the brakes of heavily loaded vehicles operating in a manner indicating an imminent skid condition should be pumped at a more rapid rate than lightly loaded vehicles. Conversely, on low $\mu$ surfaces, such as icy roads, the brakes should be pulsed relatively slower in order to bring the vehicles to a controlled stop in the shortest amount of time. However, on high $\mu$ surfaces, vehicle skid control systems heretofore developed may not reapply the brakes soon enough at the most optimum time intervals because the control circuit is designed more particularly to accommodate low $\mu$ surfaces, and, since the precise degree of wheel speed departure from vehicle speed is unknown, adjustments are not made in the operation of the skid control system to take the weight of the vehicle into account. Vehicle skid control systems of the type disclosed in my co-pending application Ser. No. 25,131, filed Apr. 2, 1970 referred to previously represent vehicle speed by a ramp signal produced in the control circuit. When the wheel speed signal in an accelerating mode (with a brake inhibit control signal being produced by the control circuit) crosses the ramp signal as the wheels spin-up, the brake inhibit signal of the system is terminated and the brakes are reapplied. However, the ramp signal is merely an estimate of true vehicle speed and may not be sufficiently accurate under all types of driving conditions to enable the skid control system to alternately disengage and reapply the brakes over the most optimum time intervals to accomplish such brake "pumping", especially when a large number of brake inhibit control signal cycles occur.

SUMMARY OF THE INVENTION

In accordance with the present invention, a control circuit having an adaptive turn-off feature for a vehicle skid control system is provided which is designed to enable the vehicle brakes to bring the vehicle to a controlled stop under adverse driving conditions, wherein the turn-off circuit portion depends on the coefficient of friction of the road surface and the degree to which the wheel speed departs from the vehicle speed during a deceleration cycle resulting in a brake inhibit control signal being produced by the control circuit. The adaptive turn-off circuit comprises a wheel departure amplifier and a turn-off threshold circuit. The input signal to the wheel departure amplifier is a DC signal representative of wheel speed. The wheel departure amplifier provides an inverted wheel departure signal as determined during a brake disengage cycle of the control circuit (i.e., a brake inhibit control signal output from the control circuit). This inverted wheel departure signal is referenced to a zero voltage, thereby making the degree of wheel speed departure from vehicle speed a factor in determining the point at which the brakes should be reapplied by turning off the brake inhibit control signal. The wheel departure amplifier circuit also includes a lead resistor which effectively shifts the inverted wheel speed signal by an amount proportional to the deceleration or acceleration rate of the wheels during a brake inhibit cycle. Since the acceleration rate of the wheels during a brake inhibit cycle is representative of the coefficient of friction of the road surface, the output of the wheel departure amplifier is an inverted signal which not only represents wheel departure speed, but also contains information indicative of the coefficient of friction of the road surface. The output of the wheel departure amplifier is fed into the turn-off threshold circuit which produces a turn-off signal as an output when the magnitude of the output of the wheel departure amplifier falls below that of a predetermined threshold. This turn-off signal from the turn-off threshold circuit is fed into a dual input NOR logic gate, the other input to the NOR gate being the output of a deceleration rate detector circuit which provides a signal indicative of the wheel speed deceleration rate. This latter wheel speed deceleration rate signal actuates a brake control circuit to produce a brake control signal (i.e. brake inhibit signal) which actuates a solenoid valve relieving the fluid braking pressure to the vehicle wheels and thereby disengaging the brakes. The output of the NOR logic gate is directed to the brake control circuit so that the deceleration rate detector circuit by producing an output signal operates to inhibit the vehicle brakes, while the adaptive turn-off circuit by producing an output signal operates to re-apply the vehicle brakes in a manner dependent upon the coefficient of friction of the road surface and the degree to which the wheel speed departs from the vehicle speed during a deceleration cycle resulting in a brake inhibit control signal being produced by the control circuit.

DETAILED DESCRIPTION OF THE DRAWINGS

Figure 1A:
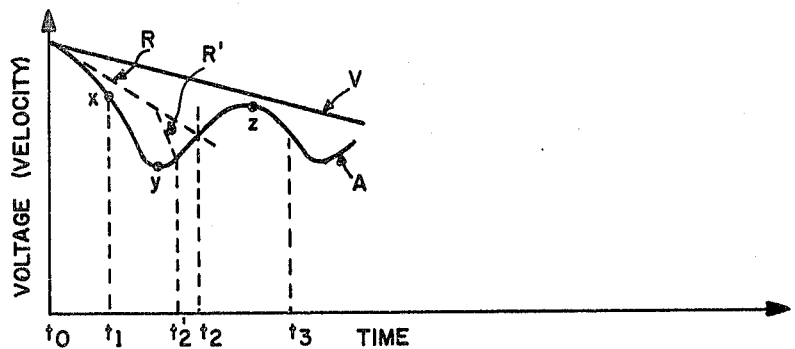
FIG. 1A is a graph representative of the operation of a conventional vehicle skid control system, and illustrating a voltage signal representative of vehicle wheel speed as a function of time.
Figure 1B:
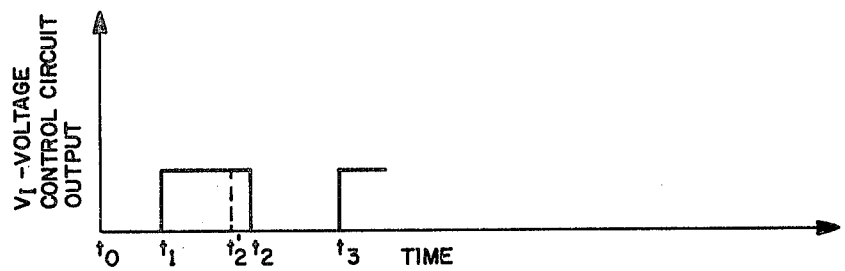
FIG. 1B is a graph representative of the operation of a conventional vehicle skid control system as in FIG. 1A, and illustrating the output of the control circuit for the skid control system as a function of time.
Figure 1C:
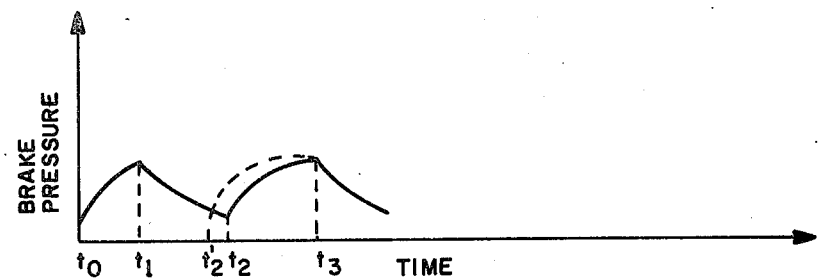
FIG. 1C is a graph representative of the operation of a conventional vehicle skid control system as in FIGS. 1A and 1B, and illustrating the vehicle brake pressure as a function of time.

Referring more specifically to the drawings, FIGS. 1A, 1B and 1C are graphs which illustrate generally the operation of a conventional skid control system. In FIG. 1A, the curve A represents a signal trace of wheel speed as a function of time during an operative cycle of the skid control system which begins with deceleration of the vehicle wheels as the operator manually applies the brakes (or brought about by adverse driving conditions contributing to partial lock-up of the wheels) wherein the wheel speed deceleration rate is excessive so as to cause the wheel speed to depart from the vehicle speed to such a degree that the control circuit is actuated (point x of FIG. 1A) to produce a brake inhibit control signal, with the brake inhibit control signal being terminated when the wheel speed again approaches vehicle speed, (point z of FIG. 1A) during spin-up of the wheels. The inclined line V in FIG. 1A represents the unknown vehicle speed which is always greater than the wheel speed A during an operative cycle of the skid control system. As indicated in FIG. 1A, at time $t_0$ the wheels begin to decelerate at a rapid rate, and, at time $t_1$, have attained a deceleration rate indicative of imminent wheel lock-up. This wheel speed deceleration rate is typically programmed as a threshold within the deceleration rate detector circuit of the skid control system and is of the order of 30 feet/sec$^2$ in the usual application. The deceleration rate of vehicle speed cannot achieve this rate under all but the most extraordinary circumstances (e.g., a collision). Therefore, a wheel speed deceleration rate greater than 30 feet/sec.$^2$ indicates that the wheel speed has departed from the vehicle speed to a degree denoting an imminent skid condition.

As shown in FIG. 1B, which is a graph of the output of the control circuit for the skid control system as a function of time, the wheel departure signal depicted in FIG. 1A causes a logical "1" output voltage $V_I$ to be produced from the control circuit at time $t_1$ corresponding to point x on curve A of FIG. 1A which is fed to the solenoid valve actuating the valve to a pressure release position in order to inhibit the vehicle brakes. The effect of the brake inhibit output signal $V_I$ is shown in FIG. 1C, which is a graph of brake pressure as a function of time. The brake pressure prior to time $t_1$ increases at a rapid rate in response to a manual braking cycle initiated by the vehicle operator. At time $t_1$, the brake pressure begins to decrease as the operation of the brakes is inhibited in response to the brake inhibit output signal from the control circuit. As shown in FIG. 1A, the wheels continue to decelerate for a finite time after the brakes are inhibited until the wheels reach minimum velocity at point y of curve A. Thereafter, the wheels begin to spin-up or accelerate until the wheel speed approaches vehicle speed at point z. Because of system delays, the brakes must be re-applied at some point between points y and z. Typically, the deceleration circuit of the skid control system may contain a built-in ramp threshold which is shown by the dashed line R in FIG. 1A, as disclosed in the skid control system comprising the subject matter of my prior U.S. Pat. No. 3,944,289, issued Mar. 16, 1976 for example. This ramp threshold R operates to terminate the brake inhibiting control signal at time $t_2$, when the wheel speed signal crosses the ramp threshold R. This ramp threshold R is variable and may be adjusted either up or down in order to change the time $t_2$, the point at which the brake inhibiting signal $V_I$ is turned off. The wheel acceleration information contained in the wheel speed signal A between points y and z may be used to program the ramp threshold R of the deceleration circuit as was done in the skid control system of my aforesaid U.S. Pat. No. 3,944,289. Thus, if a rapid rate of wheel acceleration occurs between points y and z, the ramp threshold R may be modified to decrease at a greater rate as shown by the curve R' in FIG. 1A, thereby turning off the brake inhibiting control signal $V_I$ at an earlier time, $T_2'$ as indicated in the graphs of FIGS. 1A–1C.

However, as previously noted, this manner of determining $t_2$ is relatively crude because the ramp threshold is not an accurate representation of vehicle speed and the frictional coefficient of the road surface or the degree to which the wheel speed has departed from the vehicle speed have not been taken into account. When the control circuit of the skid control system determines that the brakes may be safely reapplied, the brake inhibiting control signal $V_I$ is cut off, as shown in FIG. 1B, the result being an increase in brake pressure as shown in FIG. 1C. If the wheels again begin to approach lockup, as indicated in FIG. 1A at time $t_3$, the brake inhibiting control signal $V_I$ will again be provided as an output from the control circuit to deactivate brake operation, this sequence of brake deactivation annd brake application continuing with the effect that the brakes are pumped or pulsed, which is recommended by experts in the field as the safest method for controlled stopping of a wheeled vehicle subject to an imminent skid condition in the shortest possible distance.

In accordance with the present invention, a control circuit for a skid control system is provided, wherein the control circuit is so constructed to more precisely determine the time at which the brake inhibit control signal $V_I$ should be turned off, this turn-off time being based on the coefficient of friction of the road surface and the degree to which the wheel speed departs from the vehicle speed during the portion of the operating cycle of the control circuit in which the control circuit produces the brake inhibit control signal as an output, rather than basing the turn-off time on a relatively crude approximation of vehicle speed.

Figure 2:
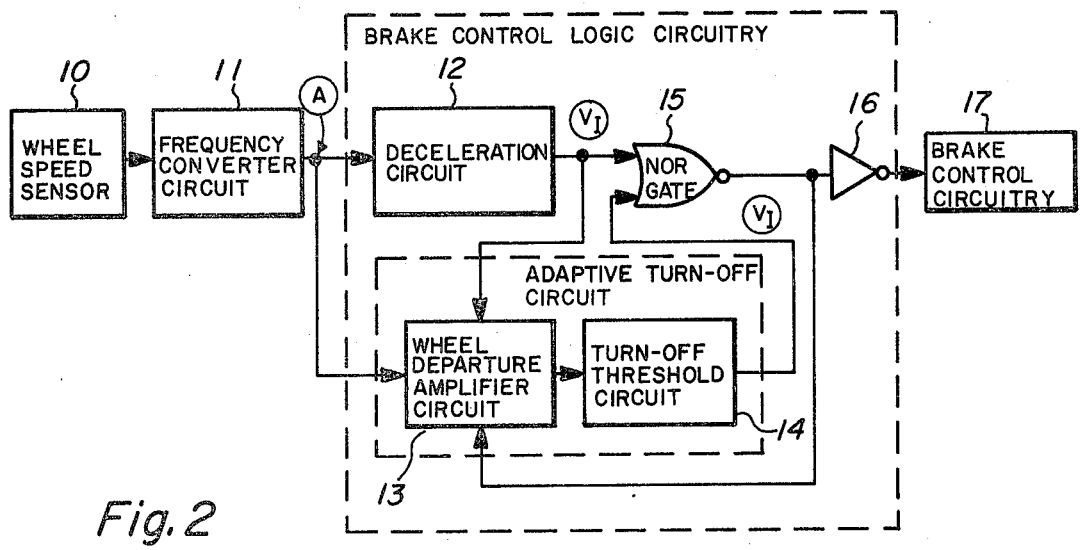
FIG. 2 is a block diagram of a control circuit for a vehicle skid control system, wherein the control circuit includes an adaptive turn-off feature in accordance with the present invention.

In the light of the foregoing discussion, and referring to FIG. 2, a block diagram of a control circuit for a skid control system of a wheeled vehicle having an adaptive turn-off feature in accordance with the present invention is illustrated. A wheel speed sensor 10, which may be coupled to the wheels or the drive shaft of the vehicle, generates an AC signal having a frequency proportional to the vehicle wheel speed. This frequency varying AC signal is coupled to a frequency converter circuit 11 that produces a DC output signal A having a voltage magnitude which is proportional to the frequency of the AC signal generated by the speed sensor and thereby representative of wheel speed. This DC wheel speed signal A as generated by the frequency converter 11 is coupled to the input of brake control logic means, being simultaneously fed to a wheel speed deceleration circuit 12 and to a wheel departure amplifier circuit 13 of the brake control logic means. The wheel speed deceleration circuit 12 is responsive to signals which have a negative slope and provides a logical "1" output $V_I$ if the negative slope of the wheel speed signal input thereto exceeds a predetermined threshold which is programmed within the deceleration circuit 12. The output of the deceleration circuit 12 comprises one of the two inputs to a NOR logic gate 15. The deceleration circuit 12 also has a ramp threshold R as mentioned previously, so that when the input signal from the frequency converter 11 crosses the ramp threshold R, as in FIG. 1A at time $t_2$, the logical "1" output of the deceleration circuit 12 is cut off. The output of the deceleration circuit 12 is also fed into the wheel departure amplifier circuit 13 in order to eliminate an error current programmed therein under certain circumstances, as will be described in greater detail hereinafter, so as to insure that the output of the wheel departure amplifier circuit 14 more accurately represents the actual differential between vehicle speed and wheel speed. The wheel departure amplifier circuit 13 comprises a circuit component of an adaptive turn-off circuit. The wheel departure amplifier circuit 13 inverts the output signal A from the frequency converter 11, references the inverted signal to 0 volts, and shifts the inverted signal a distance corresponding to the deceleration or acceleration rate of the wheels. In the latter respect, the wheel acceleration information is contained in the output signal A of the frequency converter 11 which would have a positive slope during wheel acceleration. The output of the wheel departure amplifier circuit 13 is fed into a turn-off threshold circuit 14, which comprises another circuit component of the adaptive turn-off circuit. The turn-off threshold circuit 14 has a fixed threshold voltage $V_T$ and is so constructed that when the output of the wheel departure amplifier circuit 13 goes above the fixed threshold voltage $V_T$, the turn-off threshold circuit 14 produces a logical "1" output $V_I$ to the second input of the NOR logic gate 15. The output of the NOR logic gate 15 is a logical "0" under each of the following conditions: (1) The deceleration circuit 12 produces a logical "1" output; (2) The adaptive turn-off circuit including the wheel departure amplifier circuit 13 and the turn-off threshold circuit 14, produces a logical "1" output; and (3) Both the deceleration circuit 12 and the adaptive turn-off circuit produce logical "1" outputs. The output of the NOR logic gate 15 is inverted by an inverter 16 before being input to brake control circuitry 17, so that the input to the brake control circuitry 17 will be a logical "1" under each of the three aforementioned conditions, with the brake control circuitry 17 inhibiting the brakes of the vehicle under any of those conditions. The output of the NOR logic gate 15 is also fed back to the wheel departure amplifier circuit 13 via a feedback loop in order to reset the adaptive turn-off circuit at the end of each brake inhibiting cycle, as will be described in greater detail hereinafter.

Figure 3A:
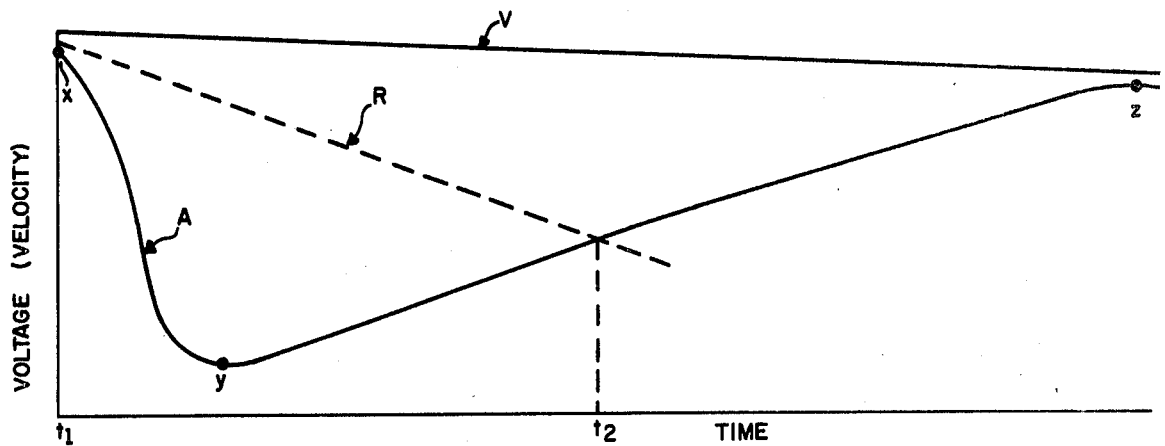
FIGS. 3A—3E are graphs representing signals at various times during the operational cycle of the control circuit shown in FIG. 2, when the vehicle is travelling on a road surface having a relatively low coefficient of friction $\mu$.
Figure 3B:
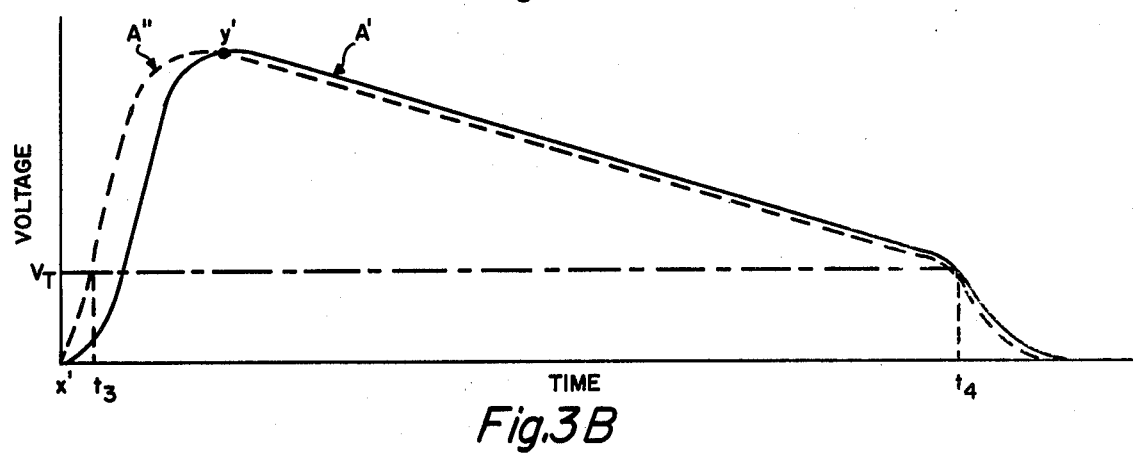
Figure 3C:
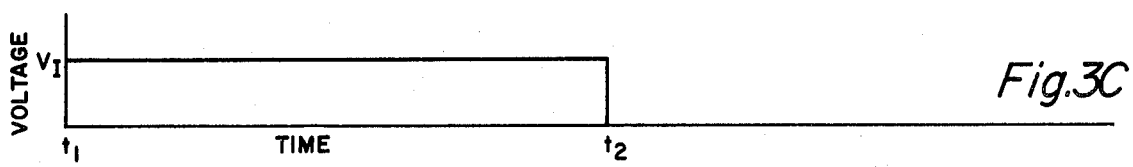

FIGS. 3A–3E comprise graphs which represent signals at various times during the operation of the control circuit of the skid control system as shown in FIG. 2 where the vehicle is travelling over a road surface having a low $\mu$ coefficient of friction. Curve A of FIG. 3A, like that of FIG. 1A, is a graph of vehicle wheel speed as a function of time, curve A being the output signal of the frequency converter 11. FIG. 3A further shows the ramp threshold R of the deceleration circuit 12 and the unknown vehicle speed as represented by the curve labeled V. At time $t_1$ in FIG. 3A, which corresponds to point x on curve A, the wheel speed begins to decrease at a rate of deceleration indicative of an imminent skid condition and, as shown in FIG. 3C, which is a graph of the output signal of the deceleration circuit 12 as a function of time, the deceleration circuit 12 produces a logical "1" brake inhibiting control signal $V_I$ commencing at time $t_1$. As indicated in FIGS. 3A and 3C, the ramp threshold R of the deceleration circuit 12 operates to terminate the brake inhibiting control signal $V_I$ at time $t_2$, when the voltage signal A representing vehicle wheel speed crosses the ramp threshold R. On a low $\mu$ braking surface, however, the vehicle wheels tend to accelerate relatively slowly once the brakes of the vehicle have been inhibited, as indicated by the curve A of FIG. 3A between points y and z thereof. Under these conditions, therefore, the reapplication of the brakes at time $t_2$ would be premature since, at time $t_2$, the wheel speed is still far below the vehicle speed.

Figure 3D:
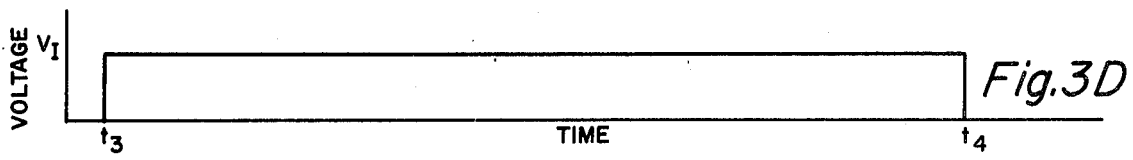
Figure 3E:
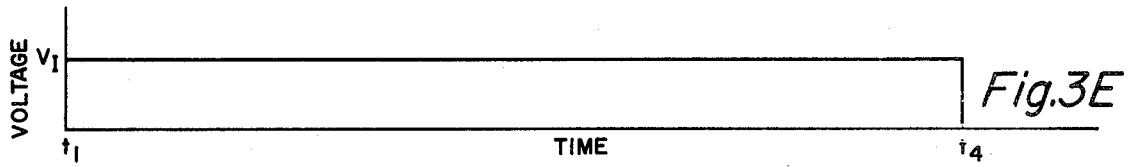

FIG. 3B illustrates various signals within the adaptive turn-off circuit during a brake inhibit-brake reapplication cycle on a low $\mu$ braking surface. As indicated in FIG. 3B when compared to FIG. 3A, the wheel departure amplifier circuit 13 inverts the output signal A of the frequency converter 11, and references the signal to 0 volts, this signal being represented by the solid line curve labeled A' in FIG. 3B. The dashed line curve A" in FIG. 3B represents the output signal of the wheel departure amplifier circuit 13. As will be explained in greater detail hereinafter, the dashed line curve A" is the result of a lead resistor provided in the wheel departure amplifier circuit 13 and is shifted to the left of curve A' by an amount proportional to the slope of curve A'. Thus it is seen in FIG. 3B that, since the slope of curve A' between points x' and y' thereof is relatively large, the shift of curve A" from curve A' is also relatively large. Conversely, the slope from point y' of curve A' is relatively small, so that curve A" is shifted to the left of curve A' only slightly from that point. The wheel acceleration represented by the portion of curve A between points y and z thereof in FIG. 3A is proportional to the coefficient of friction $\mu$ for the road surface, so that the output signal A" of the wheel departure amplifier circuit 13 contains information relating to the coefficient of friction $\mu$ of the road surface. The broken line $V_T$ of FIG. 3B represents the fixed threshold of the turn-off threshold circuit 14, and the output of the turn-off threshold circuit 14 as a function of time is shown in FIG. 3D. As indicated in FIG. 3D, the output of the turn-off threshold circuit 14 is a logical "1" brake inhibiting control signal $V_I$. The brake inhibiting control signal $V_I$ from the turn-off threshold circuit 14 commences at time $t_3$, which, as indicated in FIG. 3B, is determined by the point at which the output signal A" of the wheel departure amplifier circuit 13 crosses the fixed threshold voltage $V_T$ of the turn-off threshold circuit 14. As will be explained in greater detail hereinafter, time $t_3$ is always later than time $t_1$, so that the brake inhibiting control signal provided to brake control circuitry 17 will always be initiated by the deceleration circuit 12. As indicated in FIG. 3D, the brake inhibiting control signal $V_I$ from the turn-off threshold circuit 14 continues until time $t_4$. As indicated in FIG. 3B, time $t_4$ is determined by the point at which the output signal A" of the wheel departure amplifier circuit 13 crosses the fixed threshold voltage $V_T$ of the turn-off threshold circuit 14. FIG. 3E represents the output of the NOR logic gate 15 as inverted by the inverter 16 and comprising the output signal of the control circuit which is fed into the brake control circuitry 17 for controlling the engagement and disengagement of the vehicle brakes. As indicated in FIG. 3E, the described sequence results in the disengagement of the vehicle brakes at time $t_1$, when the control circuit determines that a skid condition is imminent by virtue of the wheel speed deceleration rate, and the reengagement of the brakes at time $t_4$.

It is thus seen that, on a low $\mu$ braking surface, the wheel departure amplifier circuit 13 and the turn-off threshold circuit 14 cooperate to extend the length of time during which the brake inhibiting control signal $V_I$ remains in effect to produce longer brake-inhibiting pulses. The time $t_4$, which effectively determines the length of the pulse, is a function of both the degree of wheel departure during the brake inhibit phase of the control circuit cycle and the coefficient of friction $\mu$ of the road surface. The degree of wheel departure is a factor in determining the time $t_4$ because the wheel departure amplifier circuit 13 inverts the wheel speed signal A and references the initial vehicle speed to 0, so that the amplitude of curve A" of FIG. 3B is representative of wheel departure. Time $t_4$, the point at which the output of the wheel departure amplifier circuit 13 crosses the fixed threshold voltage $V_T$ of the turn-off threshold circuit 14 is a function of the amplitude of curve A", since a larger amplitude will result in a longer period of time before curve A" crosses the fixed threshold $V_T$. The coefficient of friction $\mu$ of the road surface is also a factor in determining the time $t_4$, since the output signal A" of the wheel departure amplifier circuit 13 is shifted to the left of the inverted wheel speed signal A' by an amount proportional to the acceleration rate of the wheels, and the acceleration rate of the wheels is proportional to the coefficient of friction $\mu$ of the road surface.

Figure 4A:
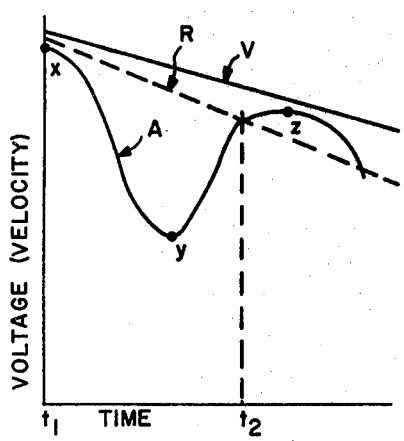
FIGS. 4A–4E are graphs representing signals at various times during the operational cycle of the control circuit shown in FIG. 2, when the vehicle is travelling on a road surface having a relatively high coeficient of friction $\mu$.
Figure 4B:
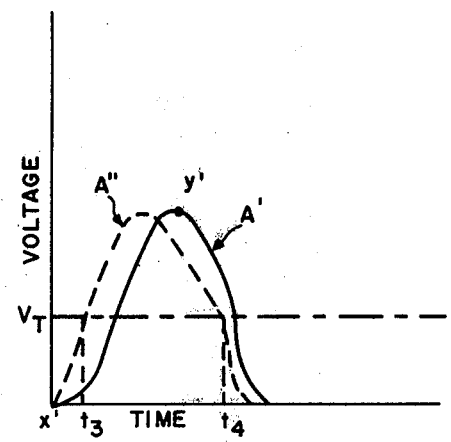
Figure 4C:
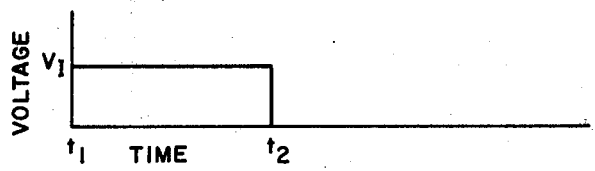
Figure 4D:
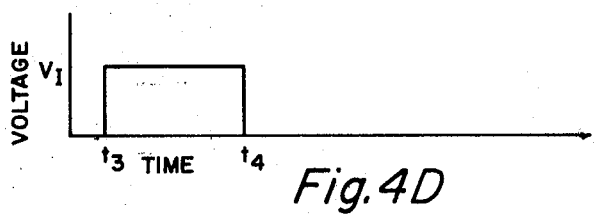
Figure 4E:
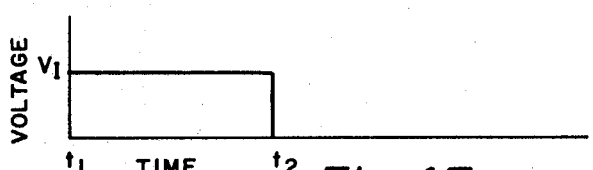

FIGS. 4A–4E comprise graphs which represent signals at various times during the operation of the control circuit of the skid control system as shown in FIG. 2 where the vehicle is travelling over a road surface having a high $\mu$ coefficient of friction. Curve A of FIG. 4A, like that of FIG. 1A, is a graph of vehicle wheel speed as a function of time, curve A being the output signal of the frequency converter 11. FIG. 4A further shows the ramp threshold R of the deceleration circuit 12 and the unknown vehicle speed as represented by the curve labeled V. At time $t_1$ in FIG. 4A, the wheel speed begins to decrease at a rate of deceleration indicative of an imminent skid condition and, as shown in FIG. 4C, which is a graph of the output signal of the deceleration circuit 12 as a function of time, the deceleration circuit 12 produces a logical "1" brake inhibiting control signal $V_I$ commencing at time $t_1$. As indicated in FIGS. 4A and 4C, the ramp threshold R of the deceleration circuit 12 operates to terminate the brake inhibiting control signal $V_I$ at time $t_2$, when the voltage signal A representing vehicle wheel speed crosses the ramp threshold R. This produces a brake inhibiting control signal of relatively short duration which is appropriate for high $\mu$ surfaces, since rapid pulsing of the vehicle brakes under these conditions is desirable. As is seen from the curve A of FIG. 4A, between points y and z thereof, on a high $\mu$ surface the vehicle wheels tend to adhere to the surface and quickly accelerate back toward the vehicle speed. FIG. 4B illustrates various signals within the adaptive turn-off circuit during a brake inhibit-brake reapplication cycle on a high $\mu$ surface. As indicated in FIG. 4B, the wheel departure amplifier circuit 13 inverts the output signal A of the frequency converter 11, and references the signal to 0 volts, this signal being represented by the solid line curve labeled A' in FIG. 4B. The dashed line curve A" in FIG. 4B represents the output signal of the wheel departure amplifier circuit 13 as a function of time, the curve A" being shifted to the left of the curve A' by the lead resistor provided in the wheel departure amplifier circuit 13 an amount proportional to the slope of curve A'. As is seen in FIG. 4B, since the road surface has a high $\mu$ coefficient of friction, the amplitude of curve A' is relatively small and the shift which results in curve A", the output of the wheel departure amplifier circuit 13, is relatively large. The broken line $V_T$ of FIG. 4B represents the fixed threshold of the turn-off threshold circuit 14, and the output of the turn-off threshold circuit 14 as a function of time is shown in FIG. 4D. As indicated in FIG. 4D, the output of the turn-off threshold circuit 14 is a logical "1" brake inhibiting control signal $V_I$. The brake inhibiting control signal $V_I$ from the turn-off threshold circuit 14 commences at time $t_3$, which, as indicated in FIG. 4B, is determined by the point at which the output signal A" of the wheel departure amplifier circuit 13 crosses the fixed threshold voltage $V_T$ of the turn-off threshold circuit 14. As indicated previously, time $t_3$ is later than time $t_1$, so that brake inhibiting control signal $V_I$ is initiated by the deceleration circuit 12. As indicated in FIG. 4D, the brake inhibiting control signal $V_I$ from the turn-off threshold circuit 14 continues until time $t_4$. As indicated in FIG. 4B, time $t_4$ is determined by the point at which the output signal A" of the wheel departure amplifier circuit 13 crosses the fixed threshold voltage $V_T$ of the turn-off threshold circuit 14. FIG. 4E represents the output of the NOR logic gate 15 as inverted by the inverter 16 and comprising the output signal of the control circuit which is fed into the brake control circuitry 17 for controlling the engagement and disengagement of the vehicle brakes. As indicated in FIG. 4E, the described sequence results in the disengagement of the vehicle brakes at time $t_1$, when the control circuit determines that a skid condition is imminent by virtue of the wheel speed deceleration rate, and the reengagement of the brakes at time $t_2$, when the wheel speed voltage signal A crosses the ramp threshold R of the deceleration circuit 12. It is thus seen that, on a high $\mu$ braking surface, the wheel departure amplifier circuit 13 and the turn-off threshold circuit 14 have no effect on the determination of the time at which the brakes are reengaged, and the deceleration circuit 12 operates to both disengage and reengage the vehicle brakes.

A comparison of the control circuit outputs of FIGS. 3E and 4E shows that the adaptive turn-off feature of the control circuit of the present invention insures that a relatively quick pumping or pulsing of the brakes will result when an imminent skid condition on a high $\mu$ surface is indicated, while a relatively slower pumping of the brakes occurs under a similar operating condition on a low $\mu$ surface. The degree of departure of wheel speed from vehicle speed is also a factor in the determination of the output of the control circuit. In this connection, the time at which the brake inhibiting control signal $V_I$ is turned off is a function of the amplitude of the inverted wheel speed voltage signal A' in that the brake inhibiting control signal $V_I$ continues until the voltage level of the shifted inverted wheel speed signal A" falls below that of the fixed threshold voltage $V_T$.

Figure 5:
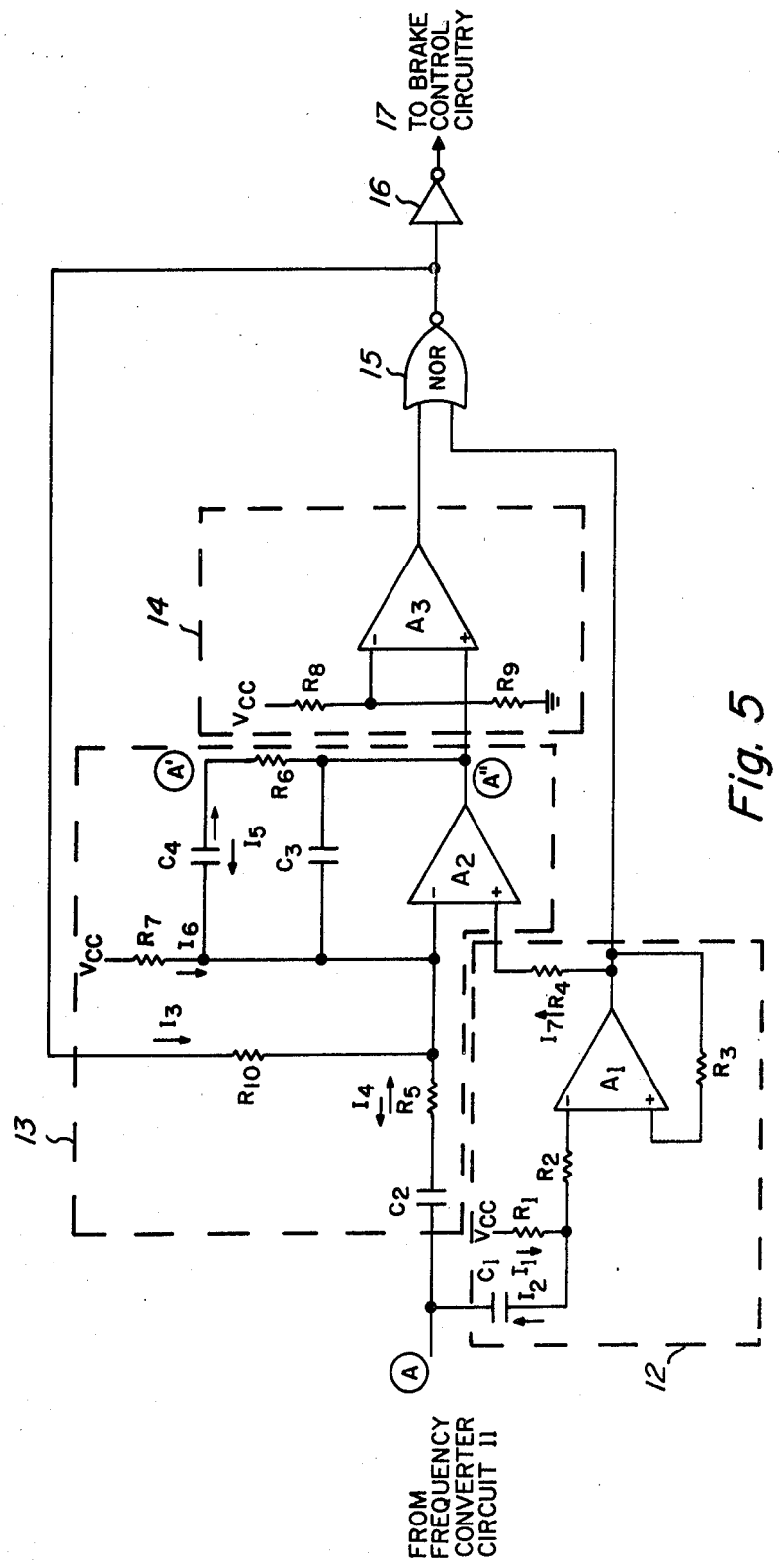
FIG. 5 is a circuit diagram of the control circuit shown in FIG. 2.

FIG. 5 is a circuit diagram of the control circuit shown in FIG. 2. As shown in FIG. 5, the input to the brake control logic circuitry of the control circuit for the vehicle skid control system is the wheel speed voltage signal A, which is the DC output of the frequency converter 11. This wheel speed signal A is fed simultaneously into the deceleration circuit 12 and the wheel departure amplifier circuit 13.

The deceleration circuit 12 includes an operational amplifier $A_1$, which is current-sensitive as opposed to voltage-sensitive, such as the operational amplifier IC LM 2900 available from Fairchild Semiconductors Incorporated of Mountain View, California. The negative input of the amplifier $A_1$ is connected to a resistor $R_2$ which in turn is connected to a resistor $R_1$ and to a capacitor $C_1$ in parallel with the resistor $R_1$. The capacitor $C_1$ is connected to the output of the frequency converter 11, and the resistor $R_1$ is connected to a reference voltage $V_{cc}$. The positive input of the amplifier $A_1$ is connected to the output thereof via a feedback loop in which a resistor $R_3$ is disposed. The output of the amplifier $A_1$ is also connected to one input of a dual input NOR logic gate 15 and to the positive input of an operational amplifier $A_2$ included in the wheel departure amplifier circuit 13 through a resistor $R_4$.

When the vehicle is travelling at a constant speed, which is the steady state condition, as indicated in FIG. 1A at time 0, the output signal A of the frequency converter 11 is a constant DC voltage, which is not passed by the capacitor $C_1$ of the deceleration circuit 12, so that no current flows through the capacitor $C_1$. A constant current $I_1$ flows through the resistor $R_1$ by virtue of the reference voltage $V_{cc}$ so that, in the steady state condition, a constant voltage exists at the junction between resistors $R_1$ and $R_2$ and at the negative input of the operation amplifier $A_1$. As the voltage level of the output signal A from the frequency converter 11 begins to decrease, which is representative of wheel departure speed, a current $I_2$, which is proportional to the decrease of signal A, begins to flow through the capacitor $C_1$ in a direction away from the amplifier $A_1$ such that current is pulled from the junction between resistors $R_1$ and $R_2$ and, concomitantly, from the negative input of the amplifier $A_1$. When the current $I_2$ exceeds the current $I_1$, so that more current is being pulled from the negative input of the amplifier $A_1$ than is being supplied, the output of the amplifier $A_1$ switches from a logical "0" state to a logical "1" state, with the result that the NOR logic gate 15 produces a logical "0" and the inverter 16 produces a logical "1" to disengage the vehicle brakes. This occurs at time $t_1$ as indicated in FIGS. 3A and 4A. It can be seen that, by choosing the proper values for resistor $R_1$ and capacitor $C_1$, the deceleration circuit 12 can be programmed so that a predetermined wheel speed deceleration rate will result in a logical "1" output from the amplifier $A_1$. As previously described, these values for the resistor $R_1$ and the capacitor $C_1$ are usually chosen such that a logical "1" output will occur when a voltage representing a wheel speed deceleration rate of greater than 30 ft. per second$^2$ occurs. As the voltage signal A continues to decrease, i.e. the wheels continue to decelerate, the voltage at the junction between resistors $R_1$ and $R_2$ follows the wheel speed voltage signal A. As the wheel speed deceleration rate begins to decrease, as a result of the disengagement of the brakes at time $t_1$, the wheel speed voltage signal A, as shown in FIGS. 3A and 4A, approaches its lowest point y. The current $I_2$ also begins to decrease, so that the magnitude of the current $I_1$ again becomes greater than that of the current $I_2$, and the capacitor $C_1$ begins to charge in a positive direction at the junction between resistors $R_1$ and $R_2$. When the voltage at the input of the amplifier $A_1$ again reaches the input threshold of the amplifier $A_1$, approximately 0.6 volts, for example, the output of the amplifier $A_1$ again switches to its logical "0" state, with the result that the NOR logic gate 15 produces a logical "1" and inverter 16 a logical "0" to reengage the vehicle brakes. This occurs at time $t_2$ in FIGS. 3A and 4A. Time $t_2$ is thus determined by the RC time constant $R_1 C_1$, and these values can be chosen so that the ramp threshold R represented by the switching times $t_1$ and $t_2$ is programmed within the deceleration circuit 12 and operates to produce relatively short pulsing of the vehicle brakes for high $\mu$ surfaces.

The control circuit further includes the wheel departure amplifier circuit 13 which has a current sensitive operational amplifier $A_2$, of the same character as the amplifier $A_1$ of the deceleration circuit 12. The operational amplifier $A_2$ may be the IC LM 2900 available from Fairchild Semiconductors Inc.. The positive input of the amplifier $A_2$ is connected to the output of the amplifier $A_1$ through a resistor $R_4$. The negative input of the amplifier $A_2$ is connected to a resistor $R_5$ which in turn is connected to a capacitor $C_2$. The capacitor $C_2$ is connected to the output of the frequency converter 11. The negative input of the amplifier $A_2$ is also connected to the output of the NOR logic gate 15 via an activator feedback loop in which a resistor $R_{10}$ is disposed. The negative input of the amplifier $A_2$ is also connected to its output via a first feedback loop in which a frequency compensation capacitor $C_3$ is disposed. The negative input of amplifier $A_2$ is further connected to a reference voltage $V_{cc}$ via a resistor $R_7$. Finally, the negative input of the amplifier $A_2$ is connected to its output via a second feedback loop which includes a capacitor $C_4$ therein and a lead resistor $R_6$ disposed between the capacitor $C_4$ and the output of the amplifier $A_2$. The capacitors $C_3$ and $C_4$ are thereby disposed across the amplifier $A_2$ in parallel branches of the first and second feedback loops of the amplifier $A_2$. The output of the amplifier $A_2$ is connected to the positive input of an operational amplifier $A_3$ included in the turn-off threshold circuit 14.

In the steady state condition, wherein the vehicle is traveling at a constant speed, the output of the NOR logic gate 15 is a logical "1". This produces a current $I_3$ through the resistor $R_{10}$ in the activator feedback loop connected to the negative input of the amplifier $A_2$. The negative input of the amplifier $A_2$ is thereby maintained at a constant voltage. As the voltage level of the wheel speed signal A from the output of the frequency converter 11 begins to decrease, which is representative of wheel speed departure, and attains a predetermined wheel speed deceleration rate, the deceleration circuit 12 operates to produce a logical "0" at the output of the NOR logic gate 15 commencing at time $t_1$, as previously described. The decrease in the voltage level of the wheel speed signal A also produces a current $I_4$, which is proportional to the deceleration rate of the wheel speed signal A, through the capacitor $C_2$ such that current is pulled from the negative input of the amplifier $A_2$. At time $t_1$, when the output of the NOR logic gate 15 switches to a logical "0" voltage level, the current $I_3$ through the resistor $R_{10}$ in the activator feedback loop to the negative input of the amplifier $A_2$ is eliminated, so that the output of the amplifier $A_2$ is free to rise from that point. Thus, the output of the amplifier $A_2$ is clamped to 0 volts until time $t_1$, when the deceleration circuit 12 operates to produce a logical "0" at the output of the NOR logic gate 15 in order to disengage the vehicle brakes. Typically, an operational amplifier has a large open loop gain, so that if current is pulled from its negative input, the voltage at the negative input decreases to a negative value and thereby causes the output of the amplifier to switch "high" by the amount of the voltage decrease at the negative input multiplied by the open loop gain. In this control circuit, however, the output of the amplifier $A_2$ is tied to its negative input by means of the resistor $R_6$ and the capacitor $C_4$ in the second feedback loop, so that the increase in the output level of the amplifier $A_2$ produces a current $I_5$ through the capacitor $C_4$ oriented toward the negative input of the amplifier $A_2$. This closed second feedback loop tends to balance the control circuit with the result that the magnitude of the current $I_5$ follows that of the current $I_4$, which is proportional to the deceleration rate of the wheels as determined from the wheel speed signal A provided by the frequency converter 11. This causes the capacitor $C_4$ to charge to an amplitude proportional to the amplitude of the wheel departure beginning at time $t_1$. The signal at the junction of the capacitor $C_4$ and the resistor $R_6$ is thus the curve A' between points x' and y' thereof of FIGS. 3B and 4B. As the wheels begin to accelerate as a result of the disengagement of the vehicle brakes caused by a brake inhibiting control signal $V_I$ from the deceleration circuit 12 at time $t_1$, the voltage level of the wheel speed signal A from the output of the frequency converter 11 begins to increase. The polarity of the current $I_4$ through the capacitor $C_2$ is thereby reversed so that the current $I_4$ is oriented into the negative input of the amplifier $A_2$. This causes the output of the amplifier $A_2$ to decrease so that the polarity of the current $I_5$ through the capacitor $C_4$ is also reversed, and capacitor $C_4$ discharges at a rate proportional to the amplitude of current $I_4$, which is proportional to the acceleration rate of the wheels. The signal at the junction of the capacitor $C_4$ and the resistor $R_6$ is thus the curve A' from the point y' thereof of FIGS. 3B and 4B. The lead resistor $R_6$ operates to produce the signal A" at the output of the amplifier $A_2$. To this end, when current $I_5$ is oriented toward the negative input of the amplifier $A_2$, the voltage drop across the resistor $R_6$, which is given by the value of the resistor $R_6$ multiplied by the magnitude of the current $I_5$, is such that the output of the amplifier $A_2$ is greater during wheel deceleration than the voltage at the junction between the capacitor $C_4$ and the resistor $R_6$, as shown by the curve A" of FIGS. 3B and 4B.

It is thus seen that, since the voltage across the resistor $R_6$ is proportional to the magnitude of both currents $I_5$ and $I_4$, which in turn are proportional to the rate of change of the wheel speed signal A, the voltage at the output of the amplifier $A_2$ is effectively shifted to the left of the signal A' by an amount proportional to the rate of change of the wheel speed during deceleration. Similarly, when current $I_5$ is oriented in the opposite direction toward the output of the amplifier $A_2$, the voltage drop across the resistor $R_6$ is proportional to the rate of change of the wheel speed during acceleration, which, as previously indicated, is proportional to the coefficient of friction $\mu$ of the road surface. Therefore, the output of the amplifier $A_2$ is lower than the voltage at the junction between the capacitor $C_4$ and the resistor $R_6$ during wheel acceleration, as shown by the curve A" of FIGS. 3B and 4B. It is thus seen that, since the voltage drop across the resistor $R_6$ is proportional to the magnitudes of both currents $I_5$ and $I_4$, which in turn are proportional to the rate of change of the wheel speed signal A, the voltage at the output of amplifier $A_2$ is effectively shifted to the left of the signal A' by an amount proportional to the rate of change of the wheel speed during acceleration.

The turn off threshold circuit 14 of the control circuit includes an operational amplifier $A_3$ of a voltage-sensitive type, such as the operational amplifier IC LM 2902, available from Texas Instruments Incorporated of Dallas, Texas. The negative input of the amplifier $A_3$ is connected to a reference voltage $V_{cc}$ via a resistor $R_8$, and to ground via a resistor $R_9$. The positive input of the amplifier $A_3$ is connected to the output of the amplifier $A_2$ of the wheel departure amplifier circuit 13. The output of the amplifier $A_3$ is connected to the other input of the dual input NOR logic gate 15. The resistors $R_8$ and $R_9$ in conjunction with the reference voltage $V_{cc}$ provide a DC voltage divider. The values of the resistors $R_8$ and $R_9$ are chosen to provide a fixed threshold voltage $V_T$ at the junction therebetween which is received at the negative input of the amplifier $A_3$.

In the steady state condition wherein the vehicle is traveling at a constant speed, the output of the amplifier $A_2$ of the wheel departure amplifier circuit 13 is at a logical "0" state. As the voltage level of the wheel speed signal A from the frequency converter 11 begins to decrease, which is representative of wheel departure, and attains a predetermined deceleration rate, the deceleration circuit 12 first operates to disengage the vehicle brakes at time $t_1$, as previously described. Thereafter, the voltage level of the inverted output signal A" of the amplifier $A_2$ of the wheel departure amplifier circuit 13 may begin to rise, and the output of the amplifier $A_3$ of the turn-off threshold circuit 14 will switch to a logical "1" state when this voltage level at the positive input of the amplifier $A_3$ exceeds the fixed threshold voltage $V_T$ at the negative input of the amplifier $A_3$. This occurs at time $t_3$ as indicated in FIGS. 3D and 4D. It is thus seen that, since the output of the amplifier $A_2$ cannot begin to rise until the deceleration circuit 12 has already provided a brake inhibiting control signal $V_I$ to disengage the vehicle brakes at time $t_1$, time $t_3$ will always be later than time $t_1$ and the deceleration circuit 12 will always be responsible for initiating the disengagement of the behicle brakes. When the output signal A" of the amplifier $A_2$ of the wheel departure amplifier circuit 13 falls below the fixed threshold voltage $V_T$ at the negative input of the amplifier $A_3$, the output of the amplifier $A_3$ will switch back to a logical "0" state. This occurs at time $t_4$, as indicated in FIGS. 3D and 4D. The logical "0" output of the turn-off threshold circuit 14 will operate, by means of the NOR logic gate 15 and inverter 16, to disengage the vehicle brakes only if time $t_4$ is greater than time $t_2$, as previously indicated.

As shown in FIG. 5, the reference voltage $V_{cc}$ in conjunction with the resistor $R_7$ produces a current $I_6$ oriented toward the negative input of the amplifier $A_2$. The current $I_6$ sets a minimum discharge rate for the wheel departure amplifier circuit 13, which is necessary to insure the discharge of capacitor $C_4$ and re-engagement of the vehicle brakes upon cessation of the skid-indicative condition and/or the effective stopping of the vehicle under the control of the skid control system. However, the current $I_6$ could operate to produce error in the operation of the control circuit for the skid control system by altering the operation of the wheel departure amplifier circuit 13 as described so as to cause the brake inhibiting control signal provided as an output of the control circuit to turn off too soon. This error is eliminated by current $I_7$ through the resistor $R_4$, the current $I_7$ being oriented into the positive input of the amplifier $A_2$ from the output of the amplifier $A_1$. The value of resistor $R_4$ is chosen so as to adjust the magnitude of current $I_7$ in order to offset current $I_6$.

Finally, when the output of the NOR logic gate 15 switches to a logical "1" state at the end of a brake disengage phase, the current $I_3$ through the resistor $R_{10}$ in the activator feedback loop is again produced and operates to quickly discharge capacitor $C_4$ and thereby reset the wheel departure amplifier circuit 13 for the next cycle. This rapid discharge is depicted by the rapid decrease of curves A' and A" to zero potential in FIGS. 3B and 4B at the end of the brake disengage-brake re-engage sequence.

In its broadest sense, the control circuit for a vehicle skid control system in accordance with the present invention produces an inverted output signal A' from the wheel departure amplifier circuit 13 that may be described as a substantial "mirror image" of the wheel speed signal A provided as an output from the frequency converter 11. The output of the amplifier $A_2$ for the wheel departure amplifier circuit 13 is effectively shifted to the left by the presence of the lead resistor $R_6$ in the wheel departure amplifier circuit 13 to provide the shifted inverted output signal A" which may be described as an offset "mirror image" of the wheel speed signal A.

The terms and expressions which have been employed herein are used as terms of description and not limitation and it is not intended, in the use of such terms and expressions, to exclude any equivalent structures with relation to the features shown and described, or portions thereof, but it will be understood that various modifications are possible within the scope of the present invention. For example, the operational amplifiers $A_1$, $A_2$ and $A_3$ could be replaced by transistor circuitry. It is therefore intended that the foregoing description and accompanying drawings should be interpreted as illustrative and not in a limiting sense.

What is claimed is:

1. In a vehicle skid control system for selectively controlling the engagement and disengagement of the vehicle brakes in accordance with selected braking conditions, control circuit means for producing a brake inhibiting control signal disengaging the vehicle brakes in response to an occurrence indicative of an imminent skid condition and terminating the brake inhibiting control signal to re-engage the vehicle brakes in response to a compensating operation of the vehicle wheels, wherein the brake inhibiting control signal is produced and terminated in a continuing sequence to automatically effect pumping of the vehicle brakes, said control circuit means comprising:

a wheel speed deceleration circuit having a predetermined deceleration rate threshold;

an adaptive turn-off circuit connected in parallel with said deceleration circuit;

each of said deceleration circuit and said adaptive turn-off circuit having respective inputs for receiving a signal proportional to vehicle wheel speed;

said deceleration circuit being responsive to a negative slope of said wheel speed signal attaining said predetermined deceleration rate threshold for providing a first brake inhibiting control signal as an output;

said adaptive turn-off circuit being responsive to the coefficient of friction of the surface over which the vehicle is travelling and the degree to which vehicle wheel speed falls below vehicle speed for providing a second brake inhibiting control signal as an output, said adaptive turn-off circuit including wheel departure amplifier means for inverting said wheel speed signal, referencing said inverted wheel speed signal to a reference voltage, and effectively shifting said inverted wheel speed signal in time an amount proportional to the coefficient of friction of the surface over which the vehicle is travelling, and turn-off threshold means connected to the output of said wheel departure amplifier means and having a threshold value incorporated therein for terminating said second brake inhibiting control signal when the output of said wheel departure amplifier means falls below said threshold value; and brake control means operably connected to said deceleration circuit and said adaptive turn-off circuit and being responsive to said first and second brake inhibiting control signals for disengaging the vehicle brakes during deceleration when a wheel speed deceleration rate corresponding to the predetermined deceleration rate threshold is attained to produce said first brake inhibiting control signal from said deceleration circuit and sequentially engaging and disengaging the vehicle brakes during acceleration upon termination of said first brake inhibiting control signal from said deceleration circuit and upon subsequent reception of said second brake inhibiting control signal from said adaptive turn-off circuit.

2. In a vehicle skid control system, control circuit means as set forth in claim 1 wherein said threshold value of said turn-off threshold means is a predetermined fixed threshold voltage.

3. In a vehicle skid control system, control circuit means as set forth in claim 1, wherein said wheel departure amplifier means includes an operational amplifier having positive and negative inputs and providing the output of said wheel departure amplifier means, first and second feedback loops extending from the output of said operational amplifier to the negative input thereof, said first and second feedback loops each having a capacitor disposed therein, said capacitors being connected in parallel across said operational amplifier, said second feedback loop further including a lead resistor disposed therein between the capacitor thereof and the output of said operational amplifier, the positive input of said operational amplifier being connected to the output of said deceleration circuit, and the magnitude of the current flowing through said lead resistor being proportional to the rate of change of said wheel speed signal and the orientation of said current being such that the voltage across said resistor is added to the voltage of said inverted wheel speed signal when the wheels of the vehicle are decelerating and subtracted from the voltage of said inverted wheel speed signal when the wheels of the vehicle are accelerating as a result of the disengagement of the vehicle brakes, whereby said resistor and said current cooperate to effectively shift said inverted wheel speed signal in time.

4. In a vehicle skid control system, control circuit means as set forth in claim 1 wherein said brake control means includes a NOR logic gate having first and second inputs and an inverter connected to the output of said NOR gate, the output of said deceleration circuit being connected to the first input of said NOR gate, and the output of said turn-off threshold means being connected to the second input of said NOR gate.

5. In a vehicle skid control system, control circuit means as set forth in claim 1 and further including reset means for resetting the output of said wheel departure amplifier means to its original state after re-engagement of the vehicle brakes.

6. In a vehicle skid control system, control circuit means as set forth in claim 4 and further including an interconnecting path between the output of said NOR gate and the input of said wheel departure amplifier means for resetting the output of said wheel departure amplifier means after re-engagement of the vehicle.

7. In a vehicle skid control system, control circuit means as set forth in claim 1 and further including an interconnecting path between the output of said deceleration circuit and the input of said wheel departure amplifier means for offsetting an error current contained therein.

* * * * *